United States Patent
Kimball (10) Patent No.: US 11,396,815 B1
(45) Date of Patent: Jul. 26, 2022

(54) STRUCTURE FOR TRAILING EDGE PORTION OF ROTOR BLADE AND METHOD OF MANUFACTURING THE STRUCTURE

(71) Applicant: The Boeing Company, Chicago, IL (US)

(72) Inventor: Nicklaus C. Kimball, Mesa, AZ (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 17/381,237

(22) Filed: Jul. 21, 2021

(51) Int. Cl.
*F01D 5/14* (2006.01)

(52) U.S. Cl.
CPC .......... *F01D 5/147* (2013.01); *F05D 2230/20* (2013.01); *F05D 2240/30* (2013.01)

(58) Field of Classification Search
CPC ............... F01D 5/147; F05D 2230/20; B64C 2027/4736; B64C 27/473
See application file for complete search history.

(56) References Cited

U.S. PATENT DOCUMENTS

| | | | | |
|---|---|---|---|---|
| 4,213,739 A | * | 7/1980 | Euler | B29D 99/0025 416/226 |
| 4,316,700 A | * | 2/1982 | Schramm | B64C 27/473 416/241 A |
| 4,696,623 A | * | 9/1987 | Bost | B64C 27/473 416/226 |
| 4,806,077 A | * | 2/1989 | Bost | B64C 27/473 416/144 |
| 5,248,242 A | * | 9/1993 | Lallo | B29D 99/0025 264/258 |
| 6,942,455 B2 | * | 9/2005 | Schmaling | F01D 5/145 244/22 |
| 8,043,053 B2 | * | 10/2011 | Bernhard | B64C 27/615 60/527 |

* cited by examiner

*Primary Examiner* — Courtney D Heinle
*Assistant Examiner* — Andrew Thanh Bui
(74) *Attorney, Agent, or Firm* — Quinn IP Law (57) ABSTRACT

A structure for a trailing edge portion of a rotor blade, wherein the rotor blade has a leading edge, a trailing edge, and opposed upper and lower airfoil profiles each beginning at the leading edge and terminating at the trailing edge. The structure includes an inner core having a generally caret-shaped cross-sectional profile and upper and lower skins adhered to the inner core. The upper and lower skins have respective first and second portions adhered to the inner core, and respective third portions which are adhered to each other and which extend aftward to proximate the trailing edge. An upper pocket is defined by the second and third upper skin portions and the upper airfoil profile, and a lower pocket is defined by the second and third lower skin portions and the lower airfoil profile. The upper and lower pockets are filled with a fairing compound and/or an expandable adhesive.

20 Claims, 9 Drawing Sheets

STRUCTURE FOR TRAILING EDGE PORTION OF ROTOR BLADE AND METHOD OF MANUFACTURING THE STRUCTURE

INTRODUCTION

This disclosure relates to structures for the trailing edge of a rotor blade, and to methods for manufacturing such structures.

The vast majority of rotor blade loads are carried in the forward two-thirds of the blade, cross-sectionally speaking. Thus, the forward or leading edge section of a rotor blade is typically designed and built to be much stronger than the aftward or trailing edge section of the blade. The primary role of the aftward or trailing edge section is to complete the desired airfoil shape or profile and to provide a limited amount to torsional stiffness to the blade.

Various approaches are utilized to manufacture rotor blades, with each having respective advantages and disadvantages as compared with the other approaches.

SUMMARY

According to one embodiment, a structure is provided for a trailing edge portion of a rotor blade, wherein the rotor blade has a leading edge, a trailing edge, and opposed upper and lower airfoil profiles each beginning at the leading edge and terminating at the trailing edge. In this embodiment, the structure includes an inner core and upper and lower skins adhered to the inner core. The inner core has opposed upper and lower inner core outer surfaces and an aftward inner core outer surface bridging the upper and lower inner core outer surfaces. The aftward inner core outer surface has a generally caret-shaped profile with an aftward upper edge contiguous with the upper inner core outer surface, an aftward lower edge contiguous with the lower inner core outer surface, and an aftward central edge disposed between and further aftward than the aftward upper and lower edges. An upper aftward surface is defined between the aftward upper and central edges and a lower aftward surface is defined between the aftward lower and central edges.

The upper skin has a first upper skin portion adhered to the upper inner core outer surface, a second upper skin portion adhered to the upper aftward surface, and a third upper skin portion extending from proximate the aftward central edge to proximate the trailing edge. The lower skin has a first lower skin portion adhered to the lower inner core outer surface, a second lower skin portion adhered to the lower aftward surface, and a third lower skin portion adhered to the third upper skin portion and extending from proximate the aftward central edge to proximate the trailing edge. An upper filling, made of at least one of a fairing compound and an expandable adhesive, fills an upper pocket defined by the second and third upper skin portions and the upper airfoil profile. Similarly, a lower filling, made of at least one of the fairing compound and the expandable adhesive, fills a lower pocket defined by the second and third lower skin portions and the lower airfoil profile.

Each of the third upper and lower skin portions may extend along a chord line extending between the leading edge and the trailing edge, and the generally caret-shaped profile may point aftward toward the trailing edge. The inner core may be made of at least one of an impact resistant structural foam material, an impact resistant structural honeycomb material, a meta-aramid polymer and a para-aramid polymer, and each of the upper and lower skins may be made of at least one of carbon fiber, fiberglass and epoxy. The fairing compound may be made of a mixture of (i) epoxy resin, polyester resin or vinyl ester resin, and (ii) at least one of silica, fiberglass, glass microbeads and a low-density filler.

The aftward central edge may be closer to the trailing edge than is either of the aftward upper and lower edges. Additionally, the aftward upper and lower edges may each be the same distance away from the trailing edge. A first upper skin corner may be defined at an intersection between the first and second upper skin portions, a first lower skin corner may be defined at an intersection between the first and second lower skin portions, the upper airfoil profile may form a substantially straight line from proximate the first upper skin corner to proximate the trailing edge, and the lower airfoil profile may form a substantially straight line from proximate the first lower skin corner to proximate the trailing edge.

The third upper and lower skin portions and an adhesive interposed therebetween may form an upper skin/lower skin sandwich which extends from proximate the aftward central edge to the trailing edge. In this arrangement, an additional portion of the upper skin/lower skin sandwich may extend beyond the trailing edge, wherein the additional portion may be a fly-away tab.

According to another embodiment, a structure for a trailing edge portion of a rotor blade is provided, wherein the rotor blade has a leading edge, a trailing edge, a chord line extending between the leading and trailing edges, and opposed upper and lower airfoil profiles each beginning at the leading edge and terminating at the trailing edge. In this embodiment, the structure includes: (i) an inner core having opposed upper and lower inner core outer surfaces and an aftward inner core outer surface bridging the upper and lower inner core outer surfaces, wherein the aftward inner core outer surface has a generally caret-shaped cross-sectional profile which points aftward toward the trailing edge with an aftward upper edge contiguous with the upper inner core outer surface, an aftward lower edge contiguous with the lower inner core outer surface, and an aftward central edge disposed between and further aftward than the aftward upper and lower edges, wherein an upper aftward surface is defined between the aftward upper and central edges and a lower aftward surface is defined between the aftward lower and central edges; (ii) an upper skin having a first upper skin portion adhered to and along the upper inner core outer surface, a second upper skin portion adhered to and along the upper aftward surface, and a third upper skin portion extending from proximate the aftward central edge to proximate the trailing edge along the chord line; (iii) a lower skin having a first lower skin portion adhered to and along the lower inner core outer surface, a second lower skin portion adhered to and along the lower aftward surface, and a third lower skin portion adhered to and along the third upper skin portion and extending from proximate the aftward central edge to proximate the trailing edge along the chord line; (iv) an upper filling made of at least one of a fairing compound and an expandable adhesive filling an upper pocket defined by the second and third upper skin portions and the upper airfoil profile; and (v) a lower filling made of at least one of the fairing compound and the expandable adhesive filling a lower pocket defined by the second and third lower skin portions and the lower airfoil profile, wherein the third upper and lower skin portions and an adhesive interposed therebetween form an upper skin/lower skin sandwich which extends from proximate the aftward central edge of the inner core to the trailing edge along the chord line.

In this embodiment, a first upper skin corner may be defined at an intersection between the first and second upper skin portions, and a first lower skin corner may be defined at an intersection between the first and second lower skin portions. The upper airfoil profile may form a substantially straight line along most of the upper airfoil profile from proximate the first upper skin corner to proximate the trailing edge, and the lower airfoil profile may form a substantially straight line along most of the lower airfoil profile from proximate the first lower skin corner to proximate the trailing edge. Further, the aftward central edge may be closer to the trailing edge than is either of the aftward upper and lower edges.

In one aspect, the aftward upper and lower edges may each be the same distance away from the trailing edge. In another aspect, an additional portion of the upper skin/lower skin sandwich may extend beyond the trailing edge, wherein the additional portion may be a fly-away tab.

According to yet another embodiment, a method of manufacturing a structure for a trailing edge portion of a rotor blade is provided, wherein the rotor blade has a leading edge, a trailing edge, a chord line extending between the leading and trailing edges, and opposed upper and lower airfoil profiles each beginning at the leading edge and terminating at the trailing edge. The method includes providing an inner core, an upper skin and a lower skin, wherein: (i) the inner core has opposed upper and lower inner core outer surfaces and an aftward inner core outer surface bridging the upper and lower inner core outer surfaces, wherein the aftward inner core outer surface has a generally caret-shaped profile with an aftward upper edge contiguous with the upper inner core outer surface, an aftward lower edge contiguous with the lower inner core outer surface, and an aftward central edge disposed between and further aftward than the aftward upper and lower edges and configured to be disposed a first distance from the trailing edge, wherein an upper aftward surface is defined between the aftward upper and central edges and a lower aftward surface is defined between the aftward lower and central edges; (ii) the upper skin has first, second and third upper skin portions wherein the second upper skin portion bridges the first and third upper skin portions; and (iii) the lower skin has first, second and third lower skin portions wherein the second lower skin portion bridges the first and third lower skin portions.

The method further includes adhering the first upper skin portion to the upper inner core outer surface and the second upper skin portion to the upper aftward surface, adhering the first lower skin portion to the lower inner core outer surface and the second lower skin portion to the lower aftward surface, and adhering the third upper and lower skin portions to each other to form an upper skin/lower skin sandwich which extends from proximate the aftward central edge.

In the method, the upper skin/lower skin sandwich may include: a first segment extending a first length from a first segment leading end proximate the aftward central edge to a first segment trailing end, wherein the first length is equivalent to the first distance; and a second segment extending a second length from a second segment leading end that is contiguous with the first segment trailing end to a second segment trailing end.

The method may further include disposing the upper skin/lower skin sandwich such that at least the first segment is stretched out along the chord line, thereby defining an upper pocket bounded by the second and third upper skin portions and the upper airfoil profile, and a lower pocket bounded by the second and third lower skin portions and the lower airfoil profile.

In one aspect, the method may further include: (i) overfilling each of the upper and lower pockets with a fairing compound, wherein the fairing compound completely fills each of the upper and lower pockets and wherein a respective excess amount of the fairing compound extends at least a predetermined distance beyond each of the respective upper and lower airfoil profiles across an entirety of the respective portions of the upper and lower airfoil profiles which cover the respective upper and lower pockets; and (ii) removing the excess amounts of fairing compound so as to leave upper and lower fillings of the fairing compound in the upper and lower pockets, respectively, such that respective outer surfaces of the upper and lower fillings coincide with the upper and lower airfoil profiles, respectively.

Alternatively, in another aspect, the method may further include: (i) depositing a respective predetermined amount of an expandable adhesive in each of the upper and lower pockets; (ii) covering each of the upper and lower pockets with a respective cover, thereby forming respective upper and lower compartments; (iii) causing the respective predetermined amounts of expandable adhesive to expand and fill the respective upper and lower compartments and harden; and (iv) removing the respective covers.

The above features and advantages, and other features and advantages, of the present teachings are readily apparent from the following detailed description of some of the best modes and other embodiments for carrying out the present teachings, as defined in the appended claims, when taken in connection with the accompanying drawings.

DETAILED DESCRIPTION

Referring now to the drawings, wherein like numerals indicate like parts in the several views, a structure 50 is provided for a trailing edge portion 51 of a rotor blade 52, and a method 100, 200 for making the structure 50, are shown and described herein.

Figure 1:
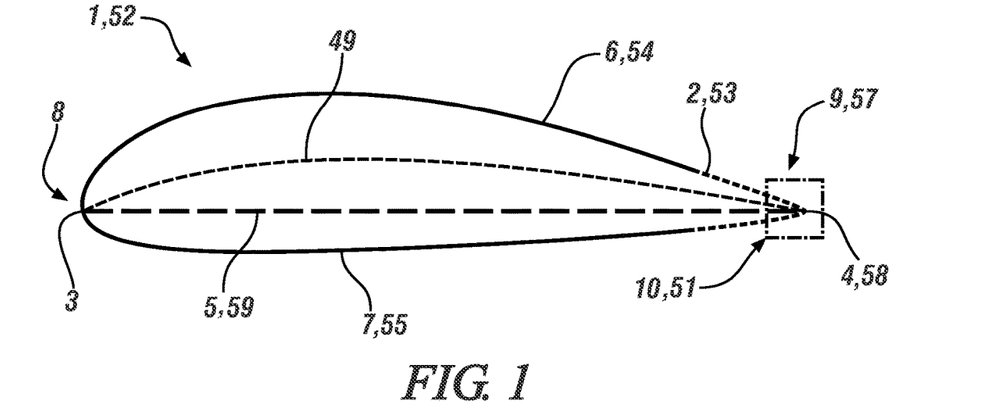
FIG. 1 is a schematic side view of a rotor blade.

FIG. 1 shows a schematic side view of a rotor blade 1, such as a helicopter blade. The rotor blade 1 has a desired or predetermined airfoil profile 2 which extends around the entire perimeter or outer surface of the rotor blade 1. The rotor blade 1 has a leading edge 3 and a trailing edge 4, with a chord line (or chord plane) 5 running in a straight line or plane from the leading edge 3 to the trailing edge 4. The rotor blade also has a camber line (or camber plane) 49 running in a curved line or plane from the leading edge 3 to the trailing edge 4, with the camber line (or camber plane) 49 being equidistant from the upper and lower airfoil profiles 6, 7 at every point along the camber line 49. The desired or predetermined airfoil profile 2 included an upper airfoil profile 6 running from the leading edge 3 to the trailing edge 4 across the top of the rotor blade 1, and a lower airfoil profile 7 running from the leading edge 3 to the trailing edge 4 across the bottom or underside of the rotor blade 1. The desired or predetermined airfoil profile 2 also includes a leading edge airfoil profile 8 at the front or forward portion of the rotor blade 1 in the area of the leading edge 3, and a trailing edge airfoil profile 9 at the rear or aftward portion of the rotor blade 1 in the area of the trailing edge 4. As indicated by the dashed square in FIG. 1, a trailing edge portion 10 of the rotor blade 1 is provided which includes the trailing edge 4, the trailing edge airfoil profile 9, and a rear portion of the rotor blade 1; in other words, the trailing edge portion 10 is shown within the dashed square.

It should be noted that certain directions or directional/orientational descriptors are used herein to describe certain elements or features and their directional orientation or relation with respect to other elements and features. For example, elements or features that are closer to the leading edge than are other similar elements/features, or elements/features that face toward the leading edge, may be described as "forward"; contrarily, elements/features that are closer to the trailing edge than are other similar elements/features, or elements/features that face toward the trailing edge, may be described as "aftward". Additionally, elements, features and directions may be described as being "inner", "internal" or "inboard", versus "outer", "external" or "outboard", depending on how they relate to the chord line 5. (That is, elements or features that are closer to the chord line 5 than are other corresponding features may be described as inner, internal or inboard, while elements or features that are further away from the chord line 5 than are other corresponding features may be described as outer, external or outboard. Similarly, elements or features which face toward the chord line 5 may be described as inner, internal or inboard, and those which face away from the chord line 5 may be described as outer, external or outboard.) Further, an element or feature may be described as "upper" or "lower" depending on whether the element or feature appears more toward the top or the bottom of the drawings, respectively.

Figure 4:
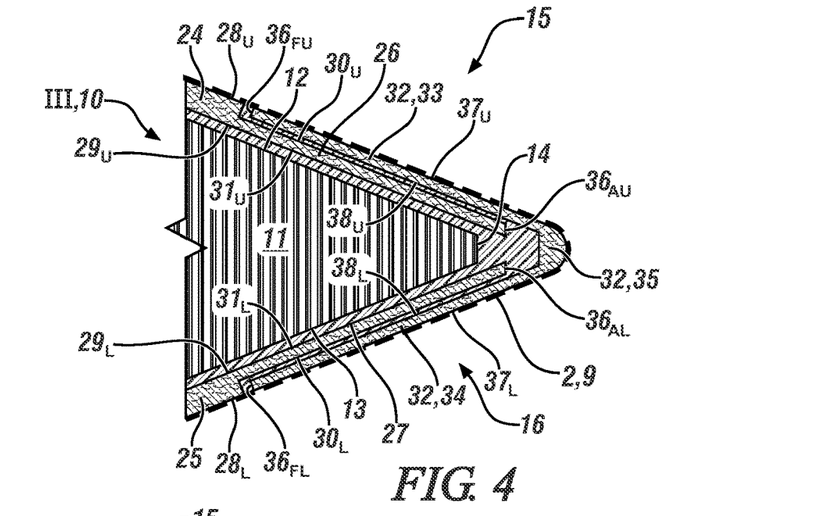
Figure 5:
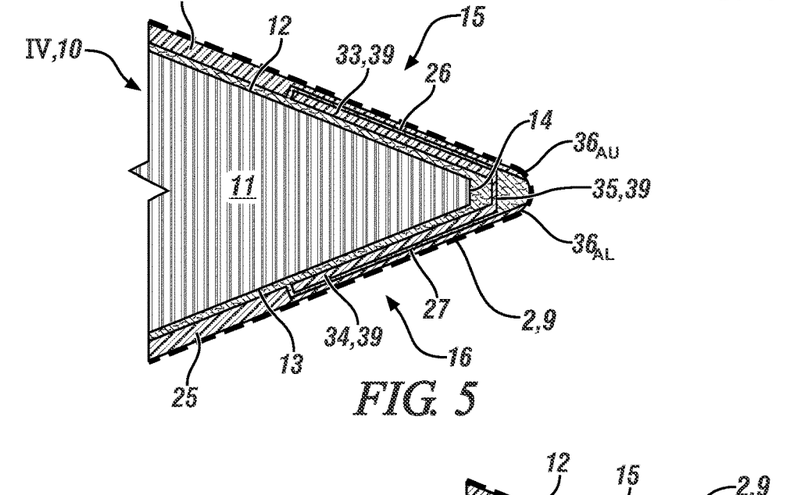
Figure 6:
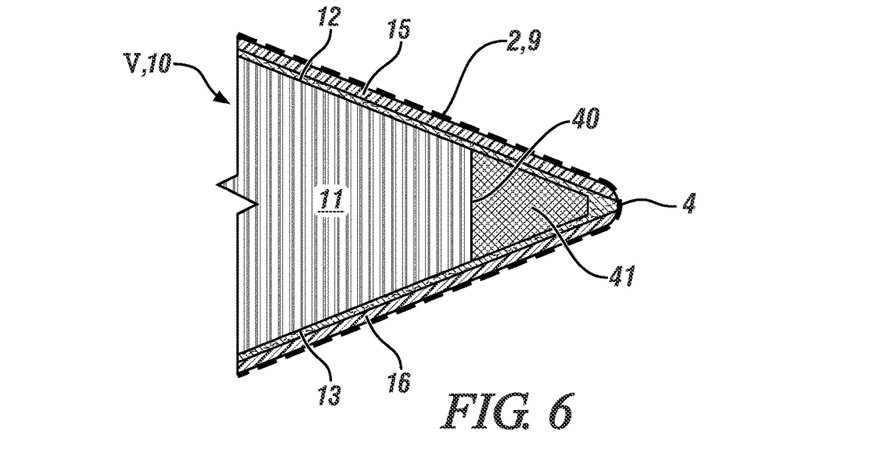
Figure 7:
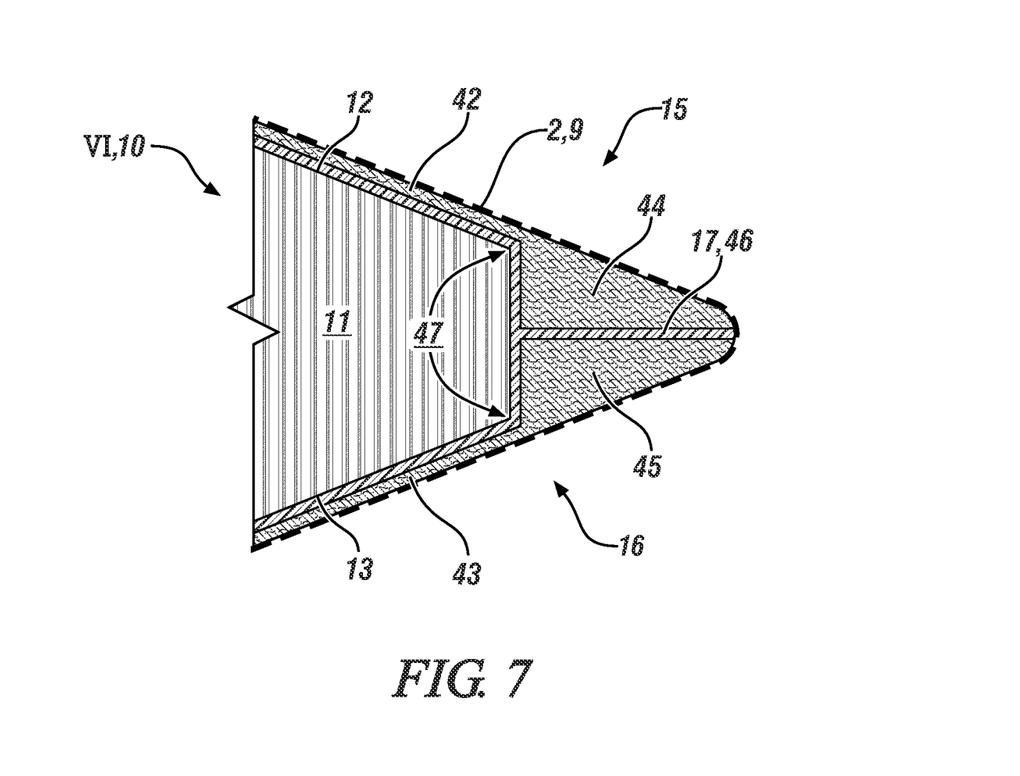
Figure 8:
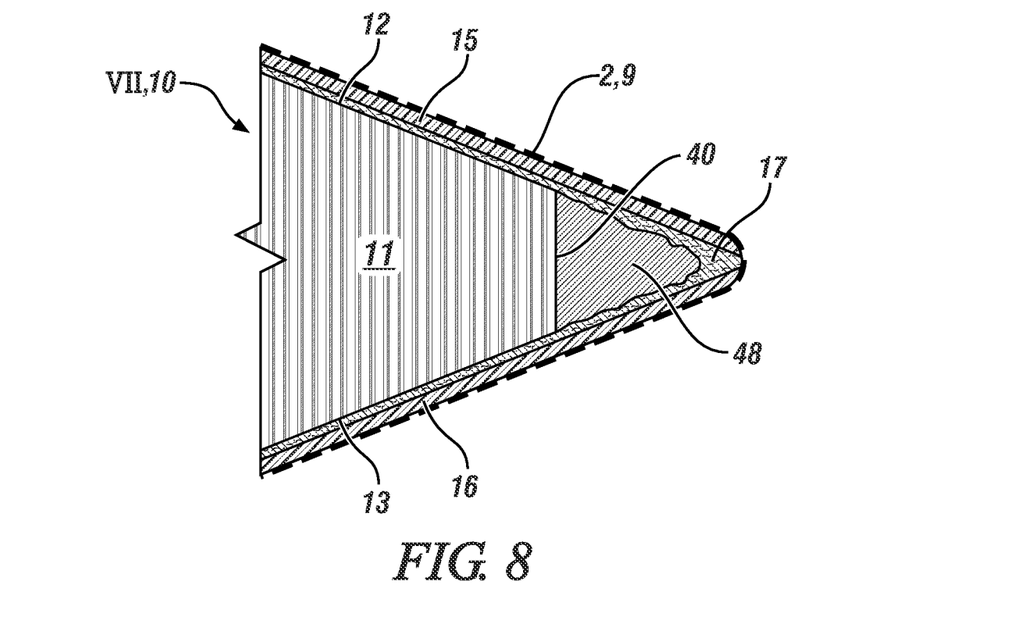

FIGS. 2-8 show cross-sectional schematic side views of a trailing edge portion 10 of a rotor blade 1, illustrating seven respective previously known approaches for constructing the trailing edge portion 10. For ease of reference, these seven views are numbered with Roman numerals I through VII and are referred to as the first through seventh approaches, respectively. It may be noted that there are several similarities among these seven approaches. For example, each of them includes using an inner core 11 having a cross-section that appears trapezoidal, and using upper and lower skins 15, 16 which are adhered by an adhesive 17 to respective upper and lower surfaces 12, 13 of the inner core 11. The aftward portion of the inner core 11 may have a relatively small/short snub-nosed aftward surface 14 (as in FIGS. 2-5), or it may have a relatively large/long snub-nosed aftward surface 40 (as shown in FIGS. 6-8). The inner core 11 may be made of an aramid material in a lightweight honeycomb structure (such as NOMEX® from DuPont de Nemours, Inc.), and the upper and lower skins 15, 16 may be carbon fiber reinforced sheets. (However, other structures and materials may be used for the inner core 11 and the upper and lower skins 15, 16.) Each of the these approaches also includes a desired or predetermined airfoil profile 2, and more specifically a trailing edge airfoil profile 9 at and around the trailing edge 4, which each approach is intended to ultimately provide or achieve.

Figure 2:
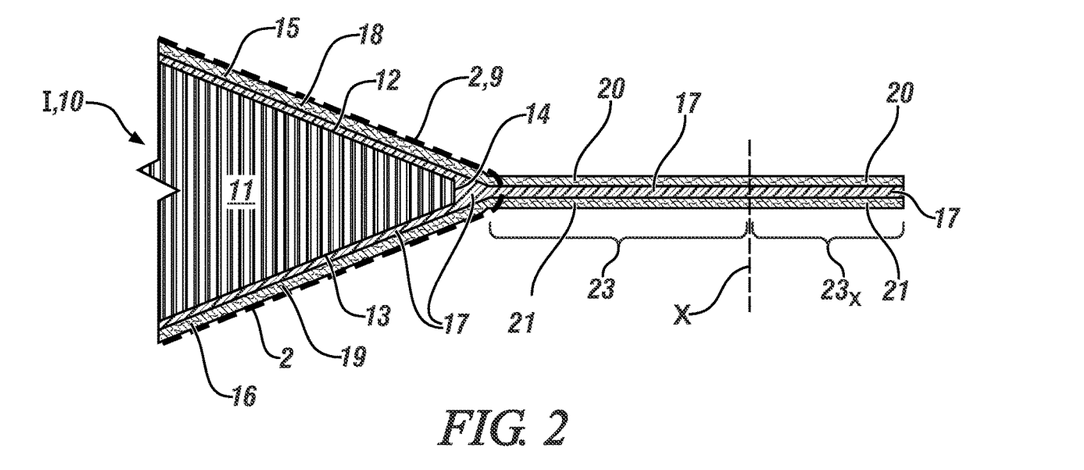
FIGS. 2-8 are cross-sectional schematic side views of a trailing edge portion of a rotor blade, illustrating seven respective previously known approaches for constructing the trailing edge portion.

FIG. 2 illustrates a first approach (I) for constructing the trailing edge portion 10 of a rotor blade 1. Here, the upper skin 15 has a first upper skin portion 18 that is adhered to the upper surface 12 of the inner core 11, and a second upper skin portion 20 that extends aftward and away from the inner core 11. Similarly, the lower skin 16 has a first lower skin portion 19 that is adhered to the lower surface 13 of the inner core 11, and a second lower skin portion 21 that extends aftward and away from the inner core 11. The second upper and lower skin portions 20, 21 are adhered together to form an upper skin/lower skin sandwich which extends aftward and away from the inner core 11. This sandwich is also called a "fly-away tab" 23, which may include an excess portion $23_X$ which may be cut away at the cut line X shown in FIG. 2. This first approach (I) may be referred to as an "external tab" approach, due to the fly-away tab 23 which is provided.

Figure 3:
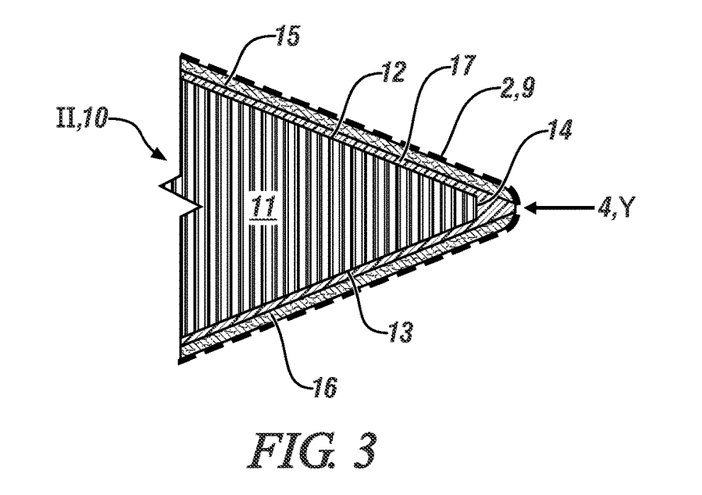

FIG. 3 illustrates a second approach (II) for constructing the trailing edge portion 10 of a rotor blade 1. Here, the upper and lower skins 15, 16 are adhered to the upper and lower surfaces 12, 13, respectively, of the inner core 11, with each skin 15, 16 terminating near (but not quite at) the trailing edge 4, in the region marked Y. Note that the aftward ends of the upper and lower skins 15, 16 do not touch or meet with each other, thus leaving a gap between them that is typically filled with the adhesive 17 that is used to adhere the skins 15, 16 to the inner core 11. This second approach (II) may be referred to as a "no tab" approach, due to its similarity to the approach of FIG. 1 but without having any fly-away tab 23.

FIG. 4 illustrates a third approach (III) for constructing the trailing edge portion 10 of a rotor blade 1. Here, in addition to the upper and lower skins 15, 16, an external V-clip 32 is included, and the upper and lower skins 15, 16 have been modified to complement and fit with the external V-clip 32. The upper skin 15 includes a first portion 24 contiguous with a second portion 26, with the first portion 24 being thicker and more forwardly disposed than the thinner and more aftwardly disposed second portion 26. Similarly, the lower skin 16 includes a first portion 25 contiguous with a second portion 27, with the first portion 25 being thicker and more forwardly disposed than the thinner and more aftwardly disposed second portion 27. The thicker upper and lower first portions 24, 25 each have a respective outer surface $28_U$, $28_L$ and a respective inner surface $29_U$, $29_L$, and the thinner upper and lower second portions 26, 27 each have a respective outer surface $30_U$, $30_L$ and a respective inner surface $31_U$, $31_L$. The external V-clip 32 includes an upper arm portion 33 and a lower arm portion 34, each extending forwardly from an aftward body portion 35. The upper and lower arm portions 33, 34 each have a respective forward edge or end $36_{FU}$, $36_{FL}$, and the upper and lower second portions 26, 27 each have a respective aftward edge or end $36_{AU}$, $36_{AL}$. Additionally, the upper and lower arm portions 33, 34 of the external V-clip 32 each have a respective outer surface $37_U$, $37_L$ and a respective inner surface $38_U$, $38_L$. Note that the upper and lower skins 15, 16 each have a "notch" or "step" provided by the transition from the thicker first portions 24, 25 to the thinner second portions 26, 27, and the upper and lower arm portion 33, 34 of the external V-clip 32 are disposed within or complementarily to these respective notches or steps. In other words, an external or outer void or pocket is provided outboard of the outer surfaces $30_U$, $30_L$ of the thinner second portions 26, 27, and the upper and lower arm portions 33, 34 of the external V-clip 32 fit within these external or outer voids or pockets. This third approach (III) may be referred to as an "external V-clip" approach.

FIG. 5 illustrates a fourth approach (IV) for constructing the trailing edge portion 10 of a rotor blade 1. This approach is similar to that of the above third approach (III), except that instead of an external V-clip 32 having upper and lower arm portions 33, 34 which fit into respective external or outer voids/pockets, the fourth approach (IV) utilizes an internal V-clip 39 having upper and lower arm portions 33, 34 which fit into respective internal or inner voids/pockets. This fourth approach (IV) may be referred to as an "internal V-clip" approach.

FIG. 6 illustrates a fifth approach (V) for constructing the trailing edge portion 10 of a rotor blade 1. Here, the inner core 11 has a relatively large/long snub-nosed aftward surface 40 which is disposed more forwardly than is the small/short snub-nosed aftward surface 14 of FIGS. 2-5. The space that is provided between this large/long sub-nosed surface 40 and the trailing edge 4, and between the upper and lower skins 15, 16, may be filled with a potting compound 41. This fifth approach (V) may be referred to as a "potting" approach.

FIG. 7 illustrates a sixth approach (VI) for constructing the trailing edge portion 10 of a rotor blade 1. Here, the upper and lower skins 15, 16 each have a respective first portion 42, 43 that is normal-sized, and a respective second portion 44, 45 that is much thicker than the corresponding first portion 42, 43. These two thicker second portions 44, 45 may be separated by a longitudinal gap or mating plane 46 (which may be filled with a thin layer of adhesive 17), with upper and lower interior corners 47 being provided as shown. This sixth approach (VI) may be referred to as a "thicker skins" approach.

FIG. 8 illustrates a seventh approach (VII) for constructing the trailing edge portion 10 of a rotor blade 1. This approach is similar to that of the above fifth approach (V) described above, except that instead of the aforementioned space being filled with a potting compound 41, here the space is filled with a so-called "noodle" and/or filler 48, as well as adhesive 17. This seventh approach (VII) may be referred to as a "noodle/filler" approach.

In contrast with above seven approaches (I-VII), a structure 50 for the trailing edge portion 51 of a rotor blade 52, and a method 100, 200 for manufacturing such a structure 50, are disclosed herein, providing benefits and technical advantages which are not taught or suggested by the foregoing approaches. These benefits and technical advantages include the use of structural elements and features, and steps in the manufacturing process, which offer less complexity, less cost and/or higher reliability as compared to previous approaches.

Figure 9:
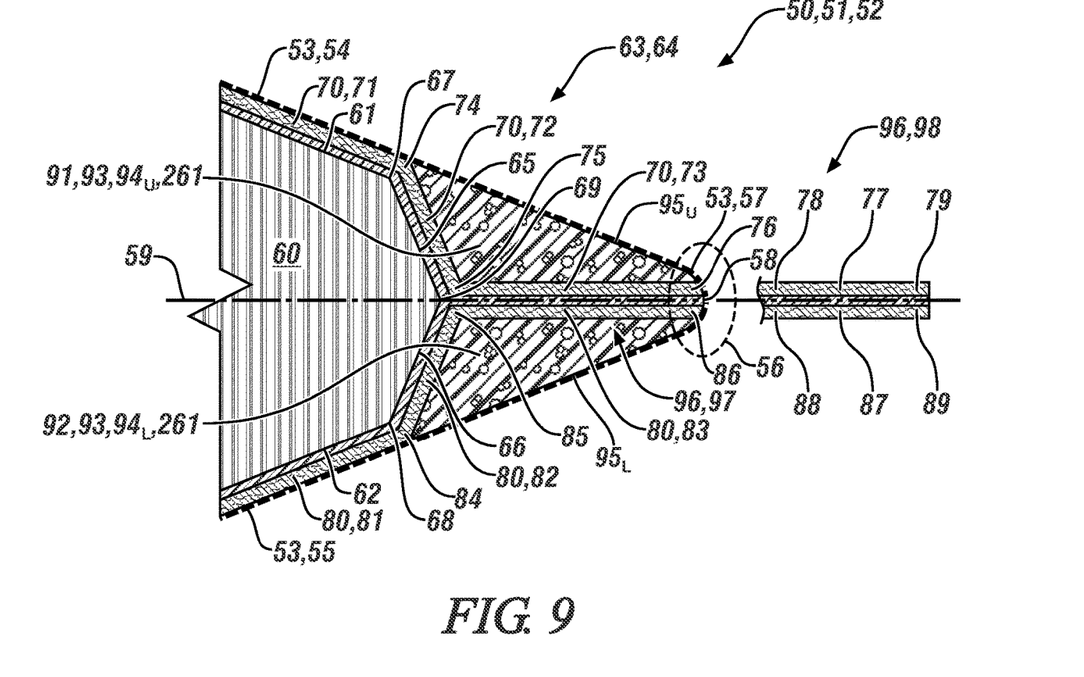
FIG. 9 is a cross-sectional schematic side view of a trailing edge portion of a rotor blade according to the present disclosure, after a fly-away tab has been cut away.
Figure 10:
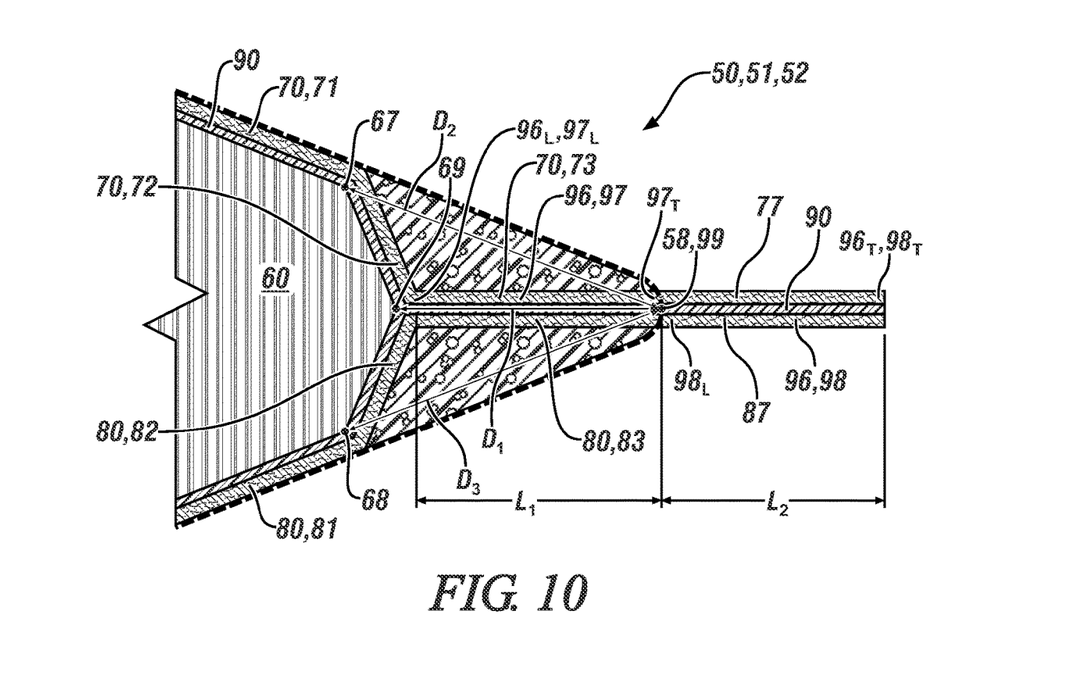
FIG. 10 is a cross-sectional schematic side view of the trailing edge portion of FIG. 9 before the fly-away tab has been cut away, and showing various measurements.

FIG. 9 shows a cross-sectional schematic side view of a trailing edge portion 51 of a rotor blade 52 according to the present disclosure, after a fly-away tab 98 has been cut away, and FIG. 10 shows a cross-sectional schematic side view of the trailing edge portion 51 of FIG. 9 before the fly-away tab 98 has been cut away, and showing various measurements. (Note that FIG. 1 may also be referenced to show various aspects and features of the trailing edge portion 51, as well as of the overall rotor blade 52.) According to one embodiment, a structure 50 is provided for a trailing edge portion 51 of a rotor blade 52, wherein the rotor blade 52 has a leading edge 3, a trailing edge 58, and opposed upper and lower airfoil profiles 54, 55 each beginning at the leading edge 3 and terminating at the trailing edge 58. The trailing edge portion 51 includes a trailing edge tip portion 56 (denoted by the dashed ellipse in FIG. 9) which includes the trailing edge 58 and a small portion of the trailing edge portion 51 immediately surrounding the trailing edge 58. Note that a chord line 59 extends between the leading and trailing edges 3, 58, and a desired or predetermined airfoil profile 53 extends about the entirety of the rotor blade 52 (i.e., around its entire periphery). This overall airfoil profile 53 includes a trailing edge airfoil profile 57, which is the portion of the overall desired or predetermined airfoil profile 53 which corresponds to or is associated with the trailing edge portion 51.

In this embodiment, as illustrated in FIGS. 9-10, the structure 50 includes an inner core 60 and upper and lower skins 70, 80 adhered to the inner core 60. The inner core 60 has opposed upper and lower inner core outer surfaces 61, 62 and an aftward inner core outer surface 63 bridging the upper and lower inner core outer surfaces 61, 62. Here, "bridging" means that the aftward inner core outer surface 63 is connected, continuous or contiguous with each of the upper and lower inner core outer surfaces 61, 62. That is, an overall aftward outer profile of the inner core 60 would include the upper inner core outer surface 61 transitioning at an aftward upper edge 67 to the aftward inner core outer surface 63, and the aftward inner core outer surface 63 transitioning at an aftward lower edge 68 to the lower inner core outer surface 62.

The aftward inner core outer surface 63 has a generally caret-shaped profile 64 with the aftward upper edge 67 contiguous with the upper inner core outer surface 61, the aftward lower edge 68 contiguous with the lower inner core outer surface 62, and an aftward central edge 69 disposed between and further aftward than the aftward upper and lower edges 67, 68. The aftward central edge 69 may be a first distance $D_1$ away from the trailing edge 58, and the aftward upper and lower edges may be a second distance $D_2$ and a third distance $D_3$ away from the trailing edge 58, respectively. As shown in FIGS. 9-10, the aftward central edge 69 may be closer to the trailing edge 58 than is either of the aftward upper and lower edges 67, 68; thus, the first distance $D_1$ may be shorter than either of the second and third distances $D_2$, $D_3$. (Optionally, in some airfoil designs the aftward upper and lower edges 67, 68 may each be the same distance away from the trailing edge 58, such that $D_2=D_3$, while in other airfoil designs these distances may be different, such that $D_2 \neq D_3$.)

An upper aftward surface 65 is defined between the aftward upper and central edges 67, 69, and a lower aftward surface 66 is defined between the aftward lower and central edges 68, 69. It may be noted that the upward and lower aftward surfaces 65, 66 make up the aftward inner core outer surface 63, and that the generally caret-shaped profile 64 may appear somewhat like a "greater than" shape, (i.e., ">"). Other descriptions for the generally caret-shaped appearance of this profile 64 include "chevron-shaped" and "V-shaped".

The upper skin 70 has a first upper skin portion 71 adhered to the upper inner core outer surface 61, a second upper skin portion 72 adhered to the upper aftward surface 65, and a third upper skin portion 73 extending from a location proximate or near the aftward central edge 69 to proximate or near the trailing edge 58. Similarly, the lower skin 80 has a first lower skin portion 81 adhered to the lower inner core outer surface 62, a second lower skin portion 82 adhered to the lower aftward surface 66, and a third lower skin portion 83 adhered to the third upper skin portion 73 and extending from a location proximate or near the aftward central edge 69 to proximate the trailing edge 58. Optionally, the upper and lower skins 70, 80 may also include respective fourth upper and lower skin portions 77, 87 which extend aftward from the trailing edge 58.

The third upper and lower skin portions 73, 83, along with an adhesive 90 interposed therebetween, form an upper skin/lower skin sandwich 96 which runs from a location proximate or near the aftward central edge 69 and extends aftward to the trailing edge 58 or beyond. In this arrangement, the upper skin/lower skin sandwich 96 may include a first segment 97 extending from proximate the aftward central edge 69 to the trailing edge 58, and a second segment 98 extending from the trailing edge 58. This second segment 98 may also be referred to as a fly-away tab 98, and also represents an additional portion of the upper skin/lower skin sandwich 96 (i.e., in addition to the first segment 97). Note that FIG. 10 shows the second segment/fly-away tab 98 before being cut away, while FIG. 9 shows it after being cut away.

As shown in FIG. 10, the upper skin/lower skin sandwich 96 may have a leading end $96_L$ and a trailing end $96_T$. The leading end $96_L$ of the upper skin/lower skin sandwich 96 may also be the leading end $97_L$ of the first segment 97, and the trailing end $96_T$ of the upper skin/lower skin sandwich 96 may also be the trailing end $98_T$ of the second segment/fly-away tab 98. At the trailing edge 58, a transition point 99 may be defined where the first and second segments 97, 98 meet or transition from one to the other. Proximate this transition point 99, a trailing end $97_T$ of the first segment 97 may be defined, as well as a leading end $98_L$ of the second segment 98. The first segment 97 has a first length $L_1$ as measured from the aftward central edge 69 to the trailing edge 58 or transition point 99, and the second segment 98 has a second length $L_2$ as measured from the trailing edge 58 or transition point 99 to some aftward extent. The second length $L_2$ may be provided as needed in order to facilitate handling of the second segment/fly-away tab 98 during the manufacturing process.

As shown in FIG. 9, after the second segment/fly-away tab 98 is cut away from the first segment 97, the third upper and lower skin portions 73, 83 will have respective trailing ends 76, 86 disposed proximate the trailing edge 58. After separation from the first segment 97, the second segment 98 will comprise a sandwich made of the fourth upper and lower skin portions 77, 87 with a layer of adhesive 90 between them. The second segment 98 will have respective leading ends 78, 88 of the upper and lower skins 70, 80 where the second segment 98 is cut away from the first segment 97, and respective trailing ends 79, 89 opposite the leading ends 78, 88.

A first upper skin corner or edge 74 may be defined at an intersection between the first and second upper skin portions 71, 72, and a first lower skin corner or edge 84 may be defined at an intersection between the first and second lower skin portions 81, 82. Furthermore, a second upper skin corner 75 may be defined at an intersection between the second and third upper skin portions 72, 73, and a second lower skin corner 85 may be defined at an intersection between the second and third lower skin portions 82, 83. The upper airfoil profile 54 may form a substantially straight line from proximate the first upper skin corner 74 to proximate the trailing edge 58, and the lower airfoil profile 55 may form a substantially straight line from proximate the first lower skin corner 84 to proximate the trailing edge 58.

An upper filling $94_U$, made of a fairing compound 93 and/or an expandable adhesive 261, fills an upper pocket 91 defined by the second and third upper skin portions 72, 73 and the upper airfoil profile 54. Similarly, a lower filling $94_L$, made of at least one of the fairing compound 93 and the expandable adhesive 261, fills a lower pocket 92 defined by the second and third lower skin portions 82, 83 and the lower airfoil profile 55. The fairing compound 93 may be a mixture of resin and one or more fillers, optionally along with a hardener, a catalyst, and/or other components.

Each of the third upper and lower skin portions 73, 83 may extend along a chord line 59 extending between the leading edge 3 and the trailing edge 58, and the generally caret-shaped profile 64 may point aftward toward the trailing edge 58. The inner core 60 may be made of at least one of an impact resistant structural foam material, an impact resistant structural honeycomb material, a meta-aramid polymer and a para-aramid polymer, and each of the upper and lower skins 70, 80 may be made of at least one of carbon fiber, fiberglass and epoxy. The fairing compound 93 may be made of a mixture of (i) epoxy resin, polyester resin or vinyl ester resin, and (ii) at least one of silica, fiberglass, glass microbeads and a low-density filler. However, it should be noted that other materials made be used to make the inner core 60 and the fairing compound 93.

According to another embodiment, a structure 50 for a trailing edge portion 51 of a rotor blade 52 is provided, wherein the rotor blade 52 has a leading edge 3, a trailing edge 58, a chord line 59 extending between the leading and trailing edges 3, 58, and opposed upper and lower airfoil profiles 54, 55 each beginning at the leading edge 3 and terminating at the trailing edge 58. In this embodiment, the structure 50 includes: (i) an inner core 60 having opposed upper and lower inner core outer surfaces 61, 62 and an aftward inner core outer surface 63 bridging the upper and lower inner core outer surfaces 61, 62, wherein the aftward inner core outer surface 63 has a generally caret-shaped cross-sectional profile 64 which points aftward toward the trailing edge 58 with an aftward upper edge 67 contiguous with the upper inner core outer surface 61, an aftward lower edge 68 contiguous with the lower inner core outer surface 62, and an aftward central edge 69 disposed between and further aftward than the aftward upper and lower edges 67, 68, wherein an upper aftward surface 65 is defined between the aftward upper and central edges 67, 69 and a lower aftward surface 66 is defined between the aftward lower and central edges 68, 69; (ii) an upper skin 70 having a first upper skin portion 71 adhered to and along the upper inner core outer surface 61, a second upper skin portion 72 adhered to and along the upper aftward surface 65, and a third upper skin portion 73 extending from proximate the aftward central edge 69 to proximate the trailing edge 58 along the chord line 59; (iii) a lower skin 80 having a first lower skin portion 81 adhered to and along the lower inner core outer surface 62, a second lower skin portion 82 adhered to and along the lower aftward surface 66, and a third lower skin portion 83 adhered to and along the third upper skin portion 73 and extending from proximate the aftward central edge 69 to proximate the trailing edge 58 along the chord line 59; (iv) an upper filling $94_U$ made of at least one of a fairing compound 93 and an expandable adhesive 261 filling an upper pocket 91 defined by the second and third upper skin portions 72, 73 and the upper airfoil profile 54; and (v) a lower filling $94_L$ made of at least one of the fairing compound 93 and the expandable adhesive 261 filling a lower pocket 92 defined by the second and third lower skin portions 82, 83 and the lower airfoil profile 55, wherein the third upper and lower skin portions 73, 83 and an adhesive 90 interposed therebetween form an upper skin/lower skin sandwich 96 which extends from proximate the aftward central edge 69 of the inner core 60 to the trailing edge 58 along the chord line 59.

In this embodiment, a first upper skin corner 74 may be defined at an intersection between the first and second upper skin portions 71, 72, and a first lower skin corner 84 may be defined at an intersection between the first and second lower skin portions 81, 82. The upper airfoil profile 54 may form a substantially straight line along most of the upper airfoil profile 54 from proximate the first upper skin corner 74 to proximate the trailing edge 58, and the lower airfoil profile 55 may form a substantially straight line along most of the lower airfoil profile 55 from proximate the first lower skin corner 84 to proximate the trailing edge 58. Further, the aftward central edge 69 may be closer to the trailing edge 58 than is either of the aftward upper and lower edges 67, 68.

In one aspect, the aftward upper and lower edges 67, 68 may each be the same distance $D_2$, $D_3$ away from the trailing edge 58 such that $D_2 = D_3$, while in another aspect they may be different distances away from the trailing edge 58 such that $D_2 \neq D_3$. In a further aspect, an additional portion of the upper skin/lower skin sandwich 96 (i.e., the second segment 98) may extend beyond the trailing edge 58, wherein the additional portion/second segment 98 may be a fly-away tab 98.

Figure 16:
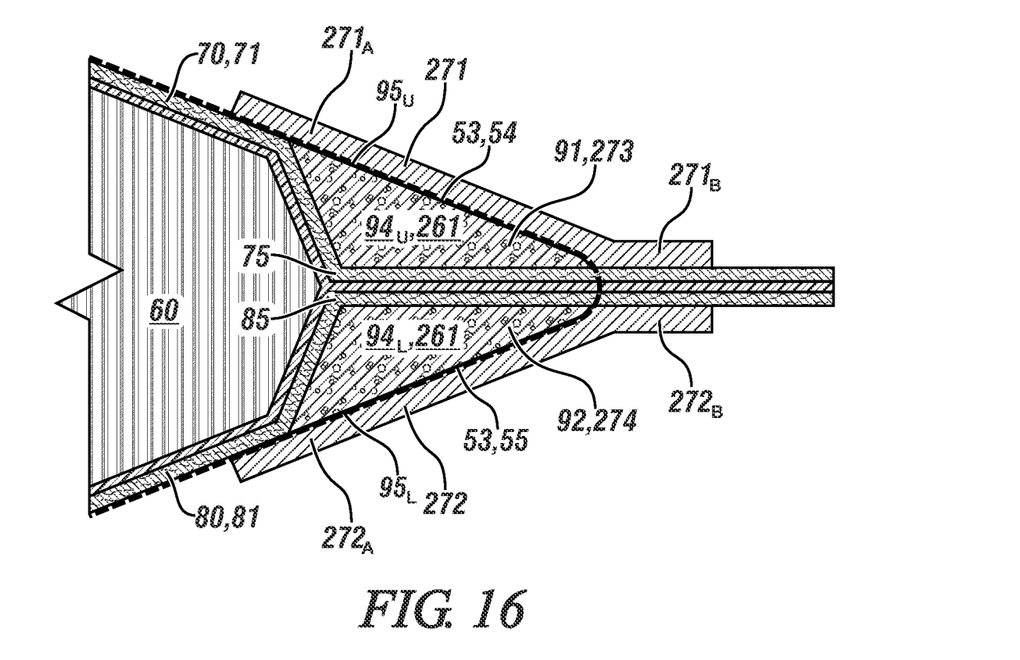
FIG. 16 is a cross-sectional schematic side view of the trailing edge portion of FIG. 15, after the expandable adhesive has been caused to expand and set within the upper and lower pockets.
Figure 17:
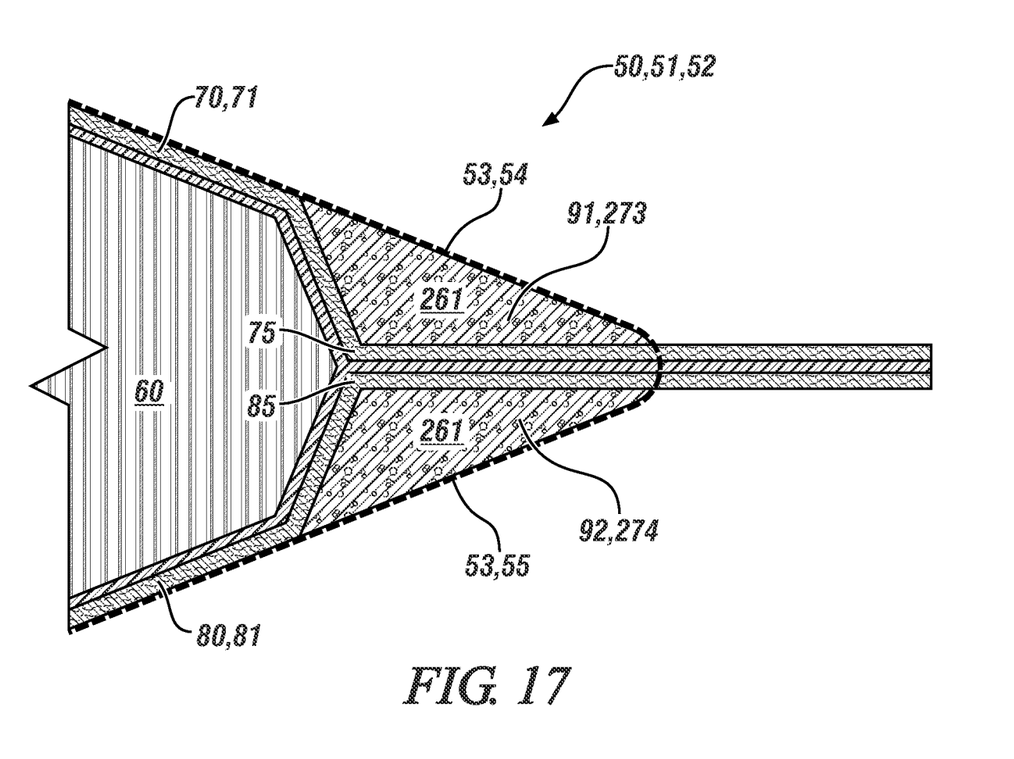
FIG. 17 is a cross-sectional schematic side view of the trailing edge portion of FIG. 16, after the upper and lower covers have been removed.
Figure 18:
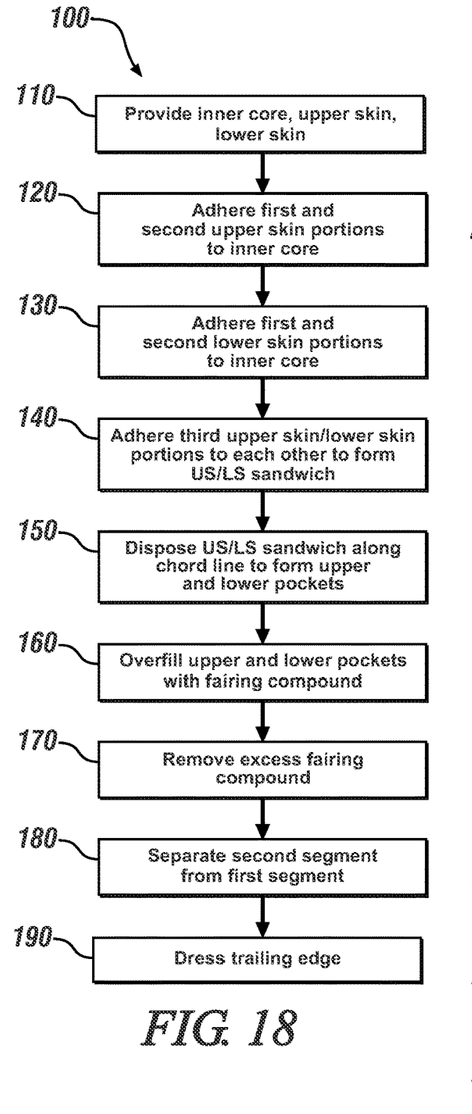
FIGS. 18-19 are flowcharts illustrating first and second methods, respectively, for manufacturing a structure for a trailing edge portion of a rotor blade.
Figure 19:
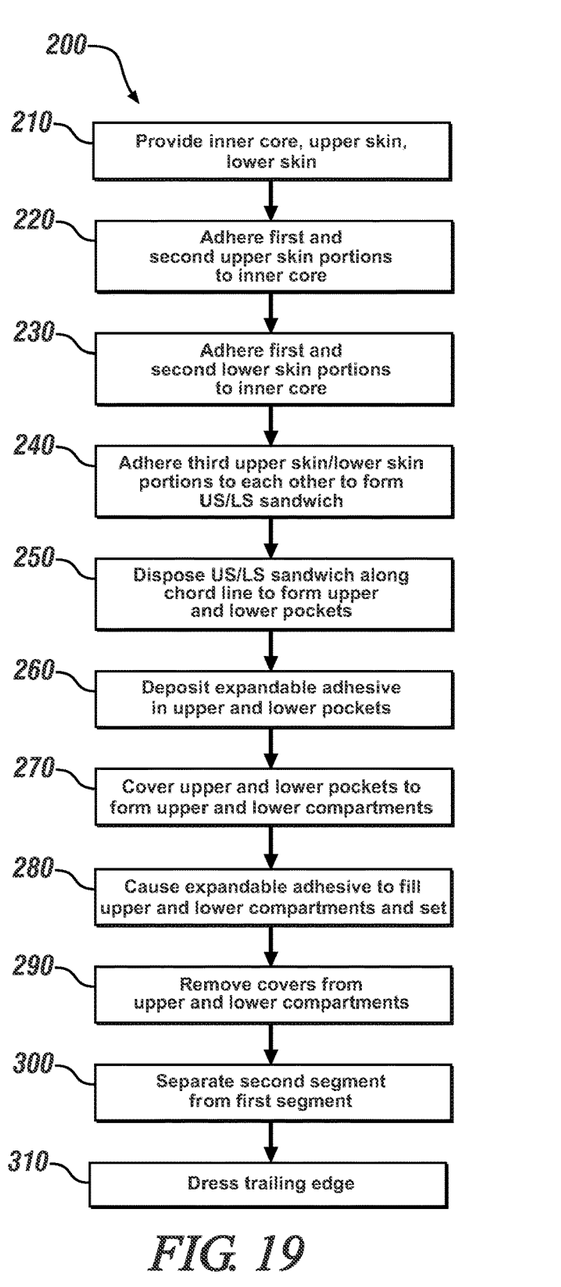

According to yet another embodiment, a method 100, 200 of manufacturing a structure 50 for a trailing edge portion 51 of a rotor blade 52 is provided, wherein the rotor blade 52 has a leading edge 3, a trailing edge 58, a chord line 59 extending between the leading and trailing edges 3, 58, and opposed upper and lower airfoil profiles 55, 56 each beginning at the leading edge 3 and terminating at the trailing edge 58. The method 100, 200 is illustrated in the flowcharts of FIGS. 18-19 as being two related series of steps; for example, steps 110-150 are the same as steps 210-250. Selected ones of these steps are also illustrated by FIGS. 11-17. As used herein, the "method 100, 200" refers to both series of steps as illustrated in FIGS. 18-19, the "first method 100" refers to the steps shown in FIG. 18, and the "second method 200" refers to the steps shown in FIG. 19.

Figure 11:
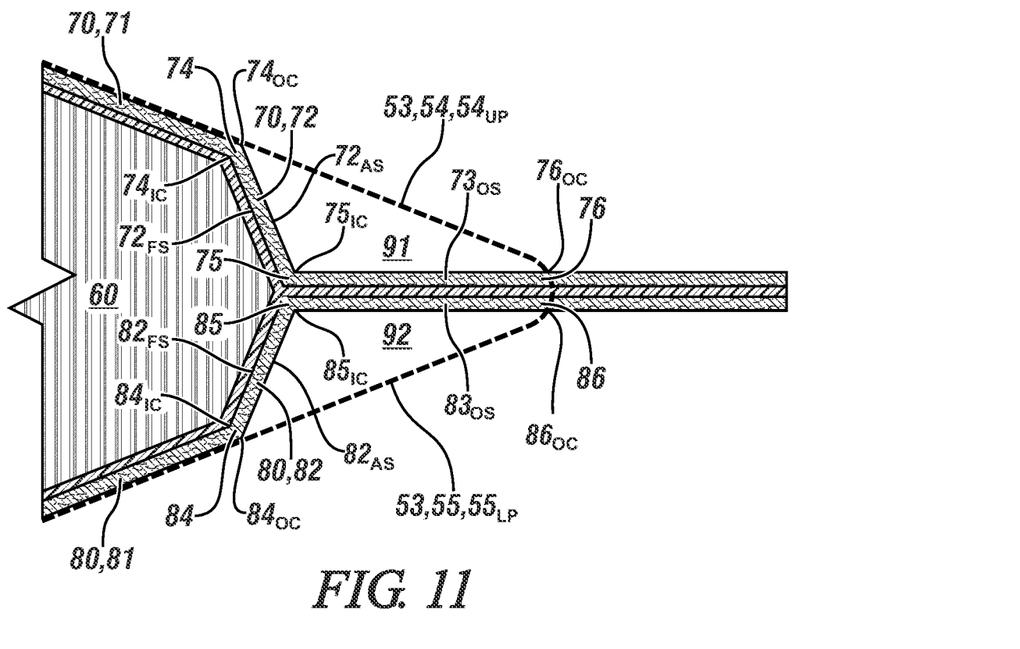
FIG. 11 is a cross-sectional schematic side view of a trailing edge portion, showing upper and lower pockets.

At blocks 110 and 210, and as illustrated in FIG. 11 (in conjunction with FIGS. 9-10), the method 100, 200 includes providing an inner core 60, an upper skin 70 and a lower skin 80, wherein: (i) the inner core 60 has opposed upper and lower inner core outer surfaces 61, 62 and an aftward inner core outer surface 63 bridging the upper and lower inner core outer surfaces 61, 62, wherein the aftward inner core outer surface 63 has a generally caret-shaped profile 64 with an aftward upper edge 67 contiguous with the upper inner core outer surface 61, an aftward lower edge 68 contiguous with the lower inner core outer surface 62, and an aftward central edge 69 disposed between and further aftward than the aftward upper and lower edges 67, 68 and configured to be disposed a first distance $D_1$ from the trailing edge 58, wherein an upper aftward surface 65 is defined between the aftward upper and central edges 67, 69 and a lower aftward surface 66 is defined between the aftward lower and central edges 68, 69; (ii) the upper skin 70 has first, second and third upper skin portions 71, 72, 73 wherein the second upper skin portion 72 bridges the first and third upper skin portions 71, 73; and (iii) the lower skin 80 has first, second and third lower skin portions 81, 82, 83 wherein the second lower skin portion 82 bridges the first and third lower skin portions 81, 83.

At blocks 120 and 220, the method 100, 200 further includes adhering the first upper skin portion 71 to the upper inner core outer surface 61 and the second upper skin portion 72 to the upper aftward surface 65. At blocks 130 and 230, the first lower skin portion 81 is adhered to the lower inner core outer surface 62 and the second lower skin portion 82 to the lower aftward surface 66. At blocks 140 and 240, the third upper and lower skin portions 73, 83 are adhered to each other to form an upper skin/lower skin sandwich 96 which extends from proximate the aftward central edge 69. In the method 100, 200, the upper skin/lower skin sandwich 96 may include: (i) a first segment 97 extending a first length $L_1$ from a first segment leading end $97_L$ proximate the aftward central edge 69, to a first segment trailing end $97_T$, wherein the first length $L_1$ is equivalent to the abovementioned first distance $D_1$; and (ii) a second segment 98 extending a second length $L_2$ from a second segment leading end $98_L$ that is contiguous with the first segment trailing end $97_T$, to a second segment trailing end $98_T$.

At blocks 150 and 250, the method 100, 200 may further include disposing the upper skin/lower skin sandwich 96 such that at least the first segment 97 is stretched out along the chord line 59, thereby defining an upper pocket 91 bounded by the second and third upper skin portions 72, 73 and the upper airfoil profile 54, and a lower pocket 92 bounded by the second and third lower skin portions 82, 83 and the lower airfoil profile 55.

FIG. 11 illustrates the resulting structure of performing steps 110-150 or steps 210-250. Note that the first upper skin corner 74 and the first lower skin corner 84 have respective inner corners $74_{IC}$, $84_{IC}$ and respective outer corners $74_{OC}$, $84_{OC}$, and that the second upper and lower skin corners 75, 85 have respective inner corners $75_{IC}$, $85_{IC}$. Further, note that the trailing ends 76, 86 of the upper and lower skins 70, 80 have respective outer corners $76_{OC}$, $86_{OC}$, the second upper and lower skin portions 72, 82 have respective forward surfaces $72_{FS}$, $82_{FS}$ and respective aftward surfaces $72_{AS}$, $82_{AS}$, and the third upper and lower skip portions 73, 83 have respective outer surfaces $73_{OS}$, $83_{OS}$. With these added details, it may be seen that the upper pocket 91 may be defined by a triangle or generally triangular cross-section having three corners or vertices—i.e., $74_{OC}$, $75_{IC}$ and $76_{OC}$—and the lower pocket 92 may also be defined by a triangle or generally triangular cross-section having three corners or vertices—i.e., $84_{OC}$, $85_{IC}$ and $86_{OC}$.

Figure 12:
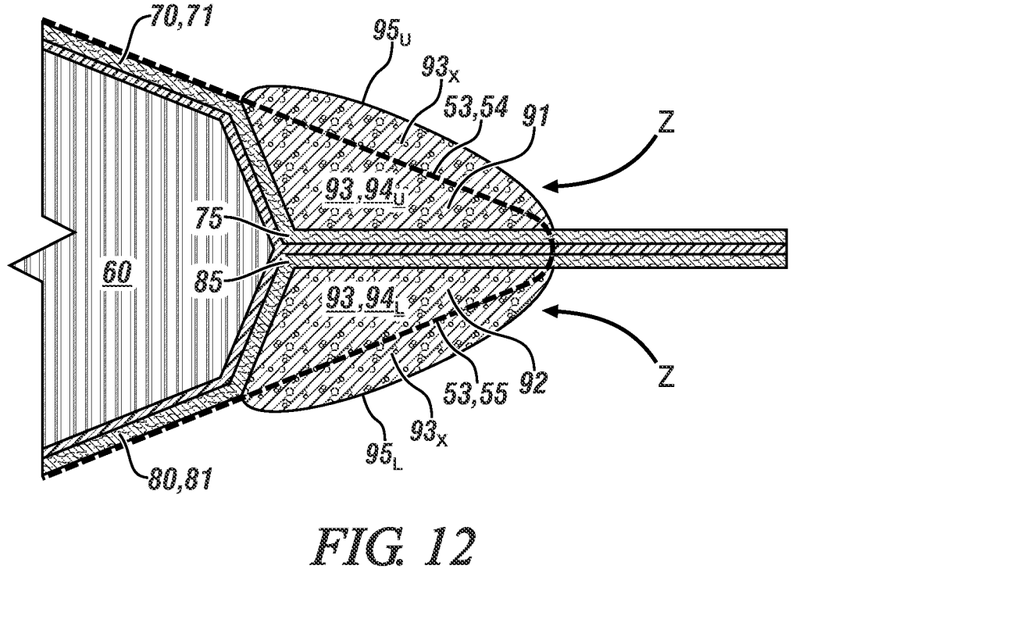
FIG. 12 is a cross-sectional schematic side view of the trailing edge portion of FIG. 11, after the upper and lower pockets have been overfilled with a fairing compound.
Figure 13:
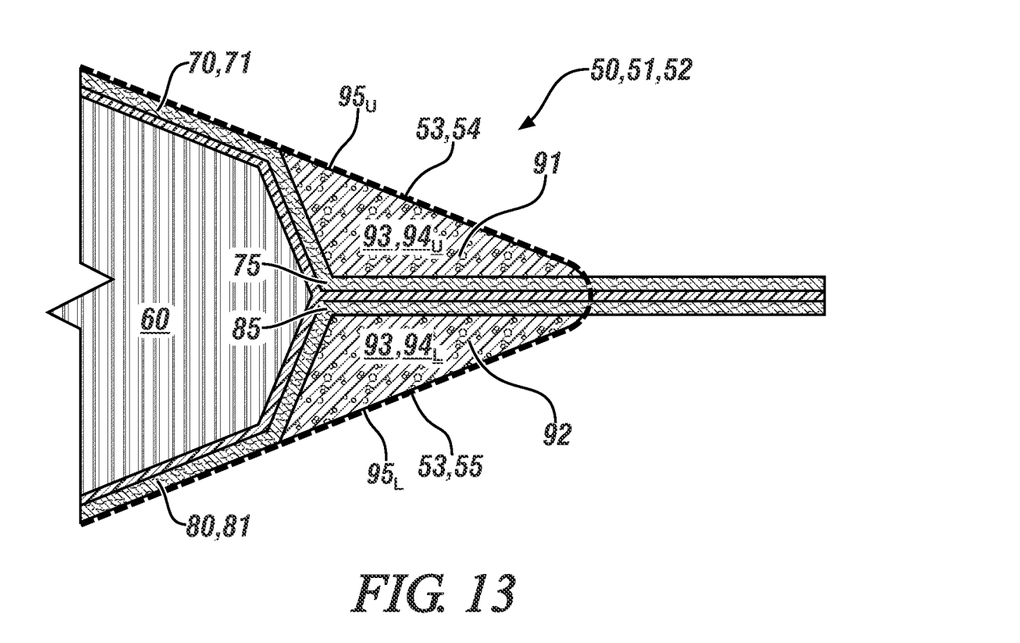
FIG. 13 is a cross-sectional schematic side view of the trailing edge portion of FIG. 12, after the removal of excess fairing compound.

In one aspect, the first method 100 may further include, at block 160 and as illustrated in FIG. 12, the step of overfilling each of the upper and lower pockets 91, 92 with a fairing compound 93, wherein the fairing compound 93 completely fills each of the upper and lower pockets 91, 92 and wherein a respective excess amount $93_X$ of the fairing compound 93 extends at least a predetermined distance Z beyond each of the respective upper and lower airfoil profiles 54, 55 across an entirety of the respective portions $54_{UP}$, $55_{LP}$ of the upper and lower airfoil profiles 54, 55 which cover the respective upper and lower pockets 91, 92. And at block 170 and as illustrated in FIG. 13, the first method 100 may further include the step of removing the excess amounts $93_X$ of fairing compound 93 so as to leave upper and lower fillings $94_U$, $94_L$ of the fairing compound 93 in the upper and lower pockets 91, 92, respectively, such that respective outer surfaces $95_U$, $95_L$ of the upper and lower fillings $94_U$, $94_L$ coincide with or match the desired upper and lower airfoil profiles 54, 55, respectively. The first method 100 may optionally further include, at block 180, the step of cutting or separating the second segment/fly-away tab 98 from the first segment 97, and/or, at block 190, the step of buffing, polishing or otherwise dressing the trailing edge 58.

Figure 14:
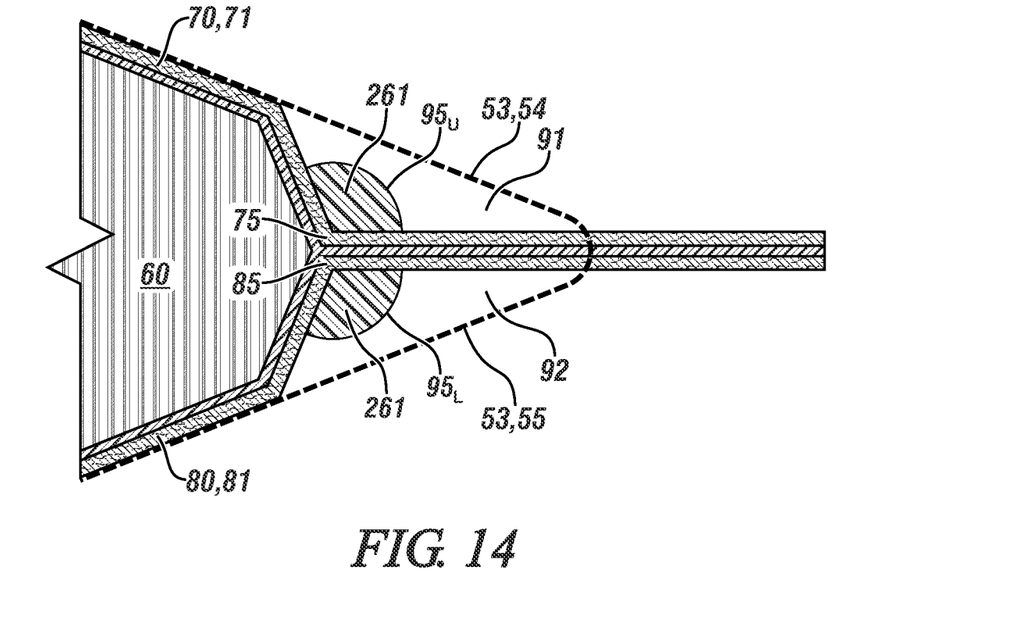
FIG. 14 is a cross-sectional schematic side view of the trailing edge portion of FIG. 11, after an expandable adhesive has been deposited into the upper and lower pockets.
Figure 15:
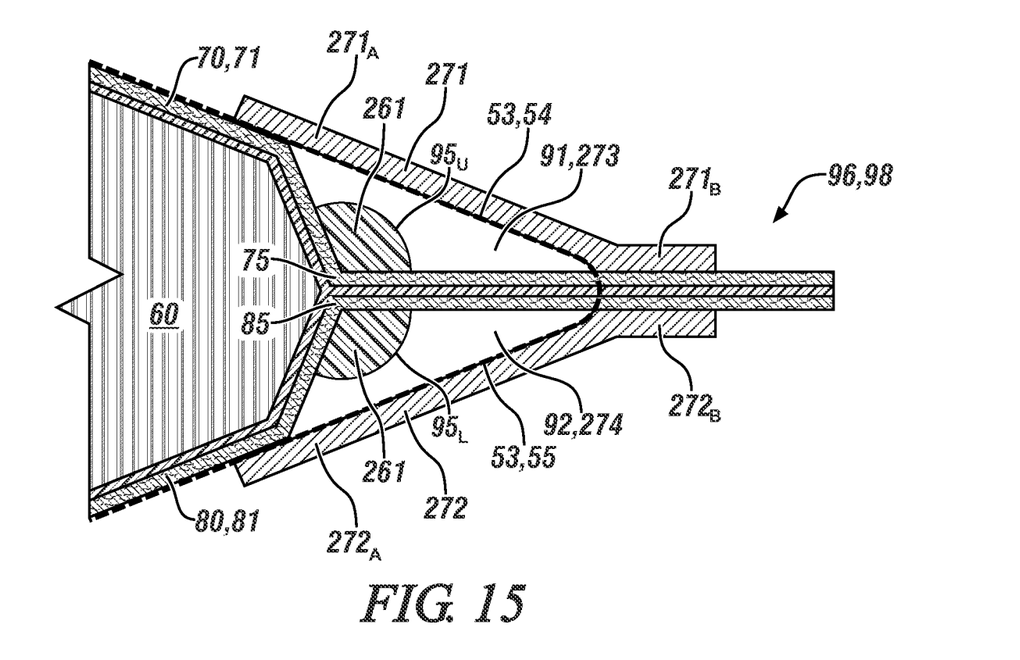
FIG. 15 is a cross-sectional schematic side view of the trailing edge portion of FIG. 14, after upper and lower covers have been placed over the upper and lower pockets.

Alternatively, in another aspect, the second method 200 may further include: (i) at block 260 and as illustrated in FIG. 14, the step of depositing a respective predetermined amount of a low-density expandable adhesive 261 in each of the upper and lower pockets 91, 92; (ii) at block 270 and as illustrated in FIG. 15, the step of covering each of the upper and lower pockets 91, 92 with a respective cover 271, 272, thereby forming respective upper and lower compartments 273, 274; (iii) at block 280 and as illustrated in FIG. 16, the step of causing the respective predetermined amounts of expandable adhesive 261 to expand and fill the respective upper and lower compartments 273, 274 and set or harden; and (iv) at block 290 and as illustrated in FIG. 17, the step of removing the respective covers 271, 272. Note that in FIG. 15, the upper and lower covers 271, 272 may have respective forward ends $271_A$, $272_A$ configured to rest upon and seal against the respective first upper and lower skin portions 71, 81, and respective aftward ends $271_B$, $272_B$ configured to rest upon and seal against the upper skin/lower skin sandwich 96. In practice, each of the upper and lower covers 271, 272 may also be configured and/or referred to as a cover plate, a caul plate, a mold plate, a mold, a bond jig, or the like, and each may be made of metal, polymer or other suitable material. (For example, the upper cover 271 may be a cover plate or caul plate made of metal and/or polymer, and the lower plate 272 may be a metallic bond jig which is larger than the upper cover 271.) In block 270, the step of covering each of the upper and lower pockets 91, 92 with a respective cover 271, 272 may involve the sub-steps of: (i) placing a cover over one of the pockets, thus covering one of the pockets and forming an inner core/upper skin/lower skin/cover assemblage; and then (ii) placing the assemblage into a mold or onto a bond jig so as to cover the other of the two pockets. Also note that in block 280, the step of causing the expandable adhesive 261 to expand, fill and set may be implemented using one or more of heat, pressure and the passage of time. The second method 200 may optionally further include, at block 300, the step of cutting or separating the second segment/fly-away tab 98 from the first segment 97, and/or, at block 310, the step of buffing, polishing or otherwise dressing the trailing edge 58.

It should be noted that since FIGS. 9-17 show cross-sectional side views of the structure 50 and trailing edge portion 51, some of the elements and features have been described herein in terms of how they appear in the two-dimensional (2D) views of the drawings. However, it should be noted that the structure 50 and trailing edge portion 51 are actually three-dimensional (3D) structures which may extend into and out of the 2D plane of the drawings. Similarly, various elements and features of the structure 50 and trailing edge portion 51 have been described in a 2D manner or with 2D nomenclature herein, but these elements and features may in actuality be 3D elements or features. (For example, the first upper and lower skin "corners" 74, 84 are each in fact edges which extend into and out of the 2D plane of the drawings.)

The above description is intended to be illustrative, and not restrictive. While the dimensions and types of materials described herein are intended to be illustrative, they are by no means limiting and are exemplary embodiments. In the following claims, use of the terms "first", "second", "top", "bottom", etc. are used merely as labels, and are not intended to impose numerical or positional requirements on their objects. As used herein, an element or step recited in the singular and preceded by the word "a" or "an" should be understood as not excluding plural of such elements or steps, unless such exclusion is explicitly stated. Additionally, the phrase "at least one of A and B" and the phrase "A and/or B" should each be understood to mean "only A, only B, or both A and B". Moreover, unless explicitly stated to the contrary, embodiments "comprising" or "having" an element or a plurality of elements having a particular property may include additional such elements not having that property. And when broadly descriptive adverbs such as "substantially" and "generally" are used herein to modify an adjective, these adverbs mean "for the most part", "to a significant extent" and/or "to a large degree", and do not necessarily mean "perfectly", "completely", "strictly" or "entirely". Additionally, the word "proximate" may be used herein to describe the location of an object or portion thereof with respect to another object or portion thereof, and/or to describe the positional relationship of two objects or their respective portions thereof with respect to each other, and may mean "near", "adjacent", "close to", "close by", "at" or the like.

This written description uses examples, including the best mode, to enable those skilled in the art to make and use devices, systems and compositions of matter, and to perform methods, according to this disclosure. It is the following claims, including equivalents, which define the scope of the present disclosure.

What is claimed is:

1. A structure for a trailing edge portion of a rotor blade, wherein the rotor blade has a leading edge, a trailing edge, and opposed upper and lower airfoil profiles each beginning at the leading edge and terminating at the trailing edge, comprising:

an inner core having opposed upper and lower inner core outer surfaces and an aftward inner core outer surface bridging the upper and lower inner core outer surfaces, wherein the aftward inner core outer surface has a generally caret-shaped profile with an aftward upper edge contiguous with the upper inner core outer surface, an aftward lower edge contiguous with the lower inner core outer surface, and an aftward central edge disposed between and further aftward than the aftward upper and lower edges, wherein an upper aftward surface is defined between the aftward upper and central edges and a lower aftward surface is defined between the aftward lower and central edges;

an upper skin having a first upper skin portion adhered to the upper inner core outer surface, a second upper skin portion adhered to the upper aftward surface, and a third upper skin portion extending from proximate the aftward central edge to proximate the trailing edge;

a lower skin having a first lower skin portion adhered to the lower inner core outer surface, a second lower skin portion adhered to the lower aftward surface, and a third lower skin portion adhered to the third upper skin portion and extending from proximate the aftward central edge to proximate the trailing edge;

an upper filling made of at least one of a fairing compound and an expandable adhesive filling an upper pocket defined by the second and third upper skin portions and the upper airfoil profile; and a lower filling made of at least one of the fairing compound and the expandable adhesive filling a lower pocket defined by the second and third lower skin portions and the lower airfoil profile.

2. The structure of claim 1, wherein each of the third upper and lower skin portions extends along a chord line extending between the leading edge and the trailing edge.

3. The structure of claim 1, wherein the generally caret-shaped profile points aftward toward the trailing edge.

4. The structure of claim 1, wherein the inner core is made of at least one of an impact resistant structural foam material, an impact resistant structural honeycomb material, a meta-aramid polymer and a para-aramid polymer, and each of the upper and lower skins is made of at least one of carbon fiber, fiberglass and epoxy.

5. The structure of claim 1, wherein the fairing compound is made of a mixture of (i) epoxy resin, polyester resin or vinyl ester resin, and (ii) at least one of silica, fiberglass, glass microbeads and a low-density filler.

6. The structure of claim 1, wherein the aftward central edge is closer to the trailing edge than is either of the aftward upper and lower edges.

7. The structure of claim 6, wherein the aftward upper and lower edges are each the same distance away from the trailing edge.

8. The structure of claim 1, wherein:
a first upper skin corner is defined at an intersection between the first and second upper skin portions;
a first lower skin corner is defined at an intersection between the first and second lower skin portions;
the upper airfoil profile forms a substantially straight line from proximate the first upper skin corner to proximate the trailing edge; and
the lower airfoil profile forms a substantially straight line from proximate the first lower skin corner to proximate the trailing edge.

9. The structure of claim 1, wherein the third upper and lower skin portions and an adhesive interposed therebetween form an upper skin/lower skin sandwich which extends from proximate the aftward central edge to the trailing edge.

10. The structure of claim 9, wherein an additional portion of the upper skin/lower skin sandwich extends beyond the trailing edge, wherein the additional portion comprises a fly-away tab.

11. A structure for a trailing edge portion of a rotor blade, wherein the rotor blade has a leading edge, a trailing edge, a chord line extending between the leading and trailing edges, and opposed upper and lower airfoil profiles each beginning at the leading edge and terminating at the trailing edge, comprising:
an inner core having opposed upper and lower inner core outer surfaces and an aftward inner core outer surface bridging the upper and lower inner core outer surfaces, wherein the aftward inner core outer surface has a generally caret-shaped cross-sectional profile which points aftward toward the trailing edge with an aftward upper edge contiguous with the upper inner core outer surface, an aftward lower edge contiguous with the lower inner core outer surface, and an aftward central edge disposed between and further aftward than the aftward upper and lower edges, wherein an upper aftward surface is defined between the aftward upper and central edges and a lower aftward surface is defined between the aftward lower and central edges;

an upper skin having a first upper skin portion adhered to and along the upper inner core outer surface, a second upper skin portion adhered to and along the upper aftward surface, and a third upper skin portion extending from proximate the aftward central edge to proximate the trailing edge along the chord line;

a lower skin having a first lower skin portion adhered to and along the lower inner core outer surface, a second lower skin portion adhered to and along the lower aftward surface, and a third lower skin portion adhered to and along the third upper skin portion and extending from proximate the aftward central edge to proximate the trailing edge along the chord line;

an upper filling made of at least one of a fairing compound and an expandable adhesive filling an upper pocket defined by the second and third upper skin portions and the upper airfoil profile; and a lower filling made of at least one of the fairing compound and the expandable adhesive filling a lower pocket defined by the second and third lower skin portions and the lower airfoil profile, wherein the third upper and lower skin portions and an adhesive interposed therebetween form an upper skin/lower skin sandwich which extends from proximate the aftward central edge of the inner core to the trailing edge along the chord line.

12. The structure of claim 11, wherein:
a first upper skin corner is defined at an intersection between the first and second upper skin portions;
a first lower skin corner is defined at an intersection between the first and second lower skin portions;
the upper airfoil profile forms a substantially straight line along most of the upper airfoil profile from proximate the first upper skin corner to proximate the trailing edge; and
the lower airfoil profile forms a substantially straight line along most of the lower airfoil profile from proximate the first lower skin corner to proximate the trailing edge.

13. The structure of claim 11, wherein the aftward central edge is closer to the trailing edge than is either of the aftward upper and lower edges.

14. The structure of claim 13, wherein the aftward upper and lower edges are each the same distance away from the trailing edge.

15. The structure of claim 11, wherein an additional portion of the upper skin/lower skin sandwich extends beyond the trailing edge, wherein the additional portion comprises a fly-away tab.

16. A method of manufacturing a structure for a trailing edge portion of a rotor blade, wherein the rotor blade has a leading edge, a trailing edge, a chord line extending between the leading and trailing edges, and opposed upper and lower airfoil profiles each beginning at the leading edge and terminating at the trailing edge, comprising:
providing an inner core, an upper skin and a lower skin, wherein:

the inner core has opposed upper and lower inner core outer surfaces and an aftward inner core outer surface bridging the upper and lower inner core outer surfaces, wherein the aftward inner core outer surface has a generally caret-shaped profile with an aftward upper edge contiguous with the upper inner core outer surface, an aftward lower edge contiguous with the lower inner core outer surface, and an aftward central edge disposed between and further aftward than the aftward upper and lower edges and configured to be disposed a first distance from the trailing edge, wherein an upper aftward surface is defined between the aftward upper and central edges and a lower aftward surface is defined between the aftward lower and central edges;

the upper skin has first, second and third upper skin portions wherein the second upper skin portion bridges the first and third upper skin portions; and the lower skin has first, second and third lower skin portions wherein the second lower skin portion bridges the first and third lower skin portions;

adhering the first upper skin portion to the upper inner core outer surface and the second upper skin portion to the upper aftward surface;

adhering the first lower skin portion to the lower inner core outer surface and the second lower skin portion to the lower aftward surface; and adhering the third upper and lower skin portions to each other to form an upper skin/lower skin sandwich which extends from proximate the aftward central edge.

17. The method of claim 16, wherein the upper skin/lower skin sandwich comprises:

a first segment extending a first length from a first segment leading end proximate the aftward central edge to a first segment trailing end, wherein the first length is equivalent to the first distance; and a second segment extending a second length from a second segment leading end that is contiguous with the first segment trailing end to a second segment trailing end.

18. The method of claim 17, further comprising:

disposing the upper skin/lower skin sandwich such that at least the first segment is stretched out along the chord line, thereby defining an upper pocket bounded by the second and third upper skin portions and the upper airfoil profile and a lower pocket bounded by the second and third lower skin portions and the lower airfoil profile.

19. The method of claim 18, further comprising:

overfilling each of the upper and lower pockets with a fairing compound, wherein the fairing compound completely fills each of the upper and lower pockets and wherein a respective excess amount of the fairing compound extends at least a predetermined distance beyond each of the respective upper and lower airfoil profiles across an entirety of the respective portions of the upper and lower airfoil profiles which cover the respective upper and lower pockets; and removing the excess amounts of fairing compound so as to leave upper and lower fillings of the fairing compound in the upper and lower pockets, respectively, such that respective outer surfaces of the upper and lower fillings coincide with the upper and lower airfoil profiles, respectively.

20. The method of claim 18, further comprising:

depositing a respective predetermined amount of an expandable adhesive in each of the upper and lower pockets;

covering each of the upper and lower pockets with a respective cover, thereby forming respective upper and lower compartments;

causing the respective predetermined amounts of expandable adhesive to expand and fill the respective upper and lower compartments and harden; and removing the respective covers.

\* \* \* \* \*